United States Patent
Price et al.

(10) Patent No.: US 11,140,615 B2
(45) Date of Patent: Oct. 5, 2021

(54) AUTOMATICALLY JOINING A WI-FI NETWORK WITH A MOBILE DEVICE BASED ON PREVIOUS DEVICE BEHAVIOR

(71) Applicant: International Business Machines Corporation, Armonk, NY (US)

(72) Inventors: Dana L. Price, Surf City, NC (US); Paul Barry, Douglas (IE)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 16/561,379

(22) Filed: Sep. 5, 2019

(65) Prior Publication Data

US 2021/0076309 A1    Mar. 11, 2021

(51) Int. Cl.
| | |
|---|---|
| H04W 4/00 | (2018.01) |
| H04W 48/14 | (2009.01) |
| H04B 17/26 | (2015.01) |
| H04W 48/20 | (2009.01) |
| H04W 48/16 | (2009.01) |
| H04W 36/24 | (2009.01) |

(52) U.S. Cl.
CPC ............ *H04W 48/14* (2013.01); *H04B 17/26* (2015.01); *H04W 48/16* (2013.01); *H04W 48/20* (2013.01); *H04W 36/245* (2013.01)

(58) Field of Classification Search
None
See application file for complete search history.

(56) References Cited

U.S. PATENT DOCUMENTS

| | | | |
|---|---|---|---|
| 8,041,319 B2* | 10/2011 | He | H04W 48/16 455/144 |
| 8,204,505 B2 | 6/2012 | Jin | |
| 9,185,542 B1 | 11/2015 | Boyle | |
| 9,693,276 B1 | 6/2017 | Wuellner | |
| 10,122,607 B2 | 11/2018 | Luna | |
| 2009/0265180 A1 | 10/2009 | Ellison | |

(Continued)

OTHER PUBLICATIONS

"A distributed virtual share network for mobile device", An IP.com Prior Art Database Technical Disclosure, Disclosed Anonymously, IP.com No. IPCOM000254131D, IP.com Electronic Publication Date: Jun. 5, 2018, 6 pages.

(Continued)

*Primary Examiner* — Bob A Phunkulh
(74) *Attorney, Agent, or Firm* — Michael A. Petrocelli

(57) ABSTRACT

A method and system for joining a Wi-Fi network with a mobile device based on historical device behavior includes detecting, using a mobile device, a new Wi-Fi network connection is available for connection by the mobile device. The method and system includes determining that the new connection meets a first connection threshold based on first connection factors. The method and system further includes analyzing historical data regarding acceptance of Wi-Fi network connections for the device. The analysis of the historical data is used to determine a pattern for accepting a connection. The method and system includes determining when to accept the new Wi-Fi network connection based on the new connection meeting the first connection threshold based on the first connection factors, and the second connection threshold based on the historical data.

20 Claims, 9 Drawing Sheets

(56) References Cited

U.S. PATENT DOCUMENTS

2011/0286437 A1* 11/2011 Austin .............. H04W 72/0413
 370/338
2013/0322329 A1 12/2013 Visuri
2014/0235200 A1 8/2014 Cai

OTHER PUBLICATIONS

"A system for automatic legal acceptance between devices and networks", An IP.com Prior Art Database Technical Disclosure, Disclosed Anonymously, IP.com No. IPCOM000253339D, IP.com Electronic Publication Date: Mar. 23, 2018, 4 pages.

"Context and user behavior driven adaptive switching between WLAN and cellular network", An IP.com Prior Art Database Technical Disclosure, Disclosed Anonymously, IP.com No. IPCOM000231008D, IP.com Electronic Publication Date: Sep. 22, 2013, 3 pages.

"How to auto-agree to work WiFi terms and conditions", r/tasker, www.reddit.com, last printed Jun. 14, 2019, 2 pages, <https://www.reddit.com/r/tasker/comments/2hsu3r/how_to_autoagree_to_work_wifi_terms_and_conditions>.

"Machine Learning to Select Best Network Access Point", An IP.com Prior Art Database Technical Disclosure, Disclosed Anonymously, IP.com No. IPCOM000252087D, IP.com Electronic Publication Date: Dec. 15, 2017, 35 pages.

"MobileConnect for Android User Guide", MobileConnect, Vonage Business, Release 22.5 | Document Version 3, last printed Jun. 14, 2019, 23 pages.

"VMware AirWatch Mobile Device Management Guide, Managing your organization's mobile devices", vmware airwatch, v.2018.05 | May 2018, 215 pages.

"WiFi Web Login Official Page", WiFi Web Login User Guide, Friday, Apr. 8, 2016, 4 pages, <http://wifiweblogin.blogspot.com/2013/02/blog-post.html>.

Mell et al., "The NIST Definition of Cloud Computing", National Institute of Standards and Technology, Special Publication 800-145, Sep. 2011, 7 pages.

* cited by examiner

AUTOMATICALLY JOINING A WI-FI NETWORK WITH A MOBILE DEVICE BASED ON PREVIOUS DEVICE BEHAVIOR

BACKGROUND

The present disclosure relates to using historical device behavior to determine when to join an available Wi-Fi network with a mobile device.

Wi-Fi is a technology which allows computers, smartphones, mobile phones, and other devices to connect to the Internet or communicate with one another wirelessly within a particular area. Wi-Fi uses a family of radio technologies commonly used for wireless local area networking (WLAN) of devices, and is based on the IEEE® (Institute of Electrical and Electronics Engineers™) 802.11 family of standards.

In many locations, there are freely available Wi-Fi networks that mobile devices can use instead of relying on cellular service. Typically, in order to use the free Wi-Fi service, a user will have to manually accept the terms and conditions of use to connect to the free Wi-Fi. In one example, a mobile device belonging to a user who moves from one location to another can lose Wi-Fi connectivity, and reconnect to a second Wi-Fi service requiring a new terms and conditions agreement be accepted by the user. Such acceptance needs to be analyzed and accepted by the user, requiring time and manual acceptance by the user including screen tapping or alternative manual selection by the user.

SUMMARY

The present disclosure recognizes the shortcomings and problems associated with connecting to a new Wi-Fi network connection. Such connection can require review and acceptance of terms and conditions agreements before being allowed to fully connect to the Wi-Fi connection.

The present invention includes a technique to automatically accept a terms and conditions agreement to avoid review and acceptance of terms and conditions agreements. This technique(s) can save the user time, and keystrokes or selections by other means, and the effort required therein. The method and system of the present disclosure can also avoid connection to an unwanted Wi-Fi network by using the techniques and features set forth herein before a device connects to a Wi-Fi network.

In one aspect according to the present invention, a method for joining a Wi-Fi network with a mobile device based on historical device behavior includes detecting, using a mobile device, that a new Wi-Fi network connection is available for connection by the mobile device. The method includes determining that the new connection meets a first connection threshold based on first connection factors, one of the first connection factors includes determining a strength of the new network connection. The method includes analyzing historical data regarding acceptance of Wi-Fi network connections for the device. The historical data includes which connections were previously accepted by a user using the device to determine a pattern for accepting connections. The method includes determining, using the analysis of the historical data including the pattern for accepting a connection, when a second connection threshold is met based on the historical data. The method includes determining when to accept the new Wi-Fi network connection based on the new connection meeting the first connection threshold based on the first connection factors, and the second connection threshold based on the historical data. The method includes initiating automatic acceptance of the new Wi-Fi connection, which includes automatic acceptance of a terms and conditions authorization received from the new network connection, in response to meeting the first connection threshold and the second connection threshold.

In another aspect according to the present invention, a system for joining a Wi-Fi network with a mobile device based on historical device behavior includes, a computer system comprising: a computer processor, a computer-readable storage medium, and program instructions stored on the computer-readable storage medium being executable by the processor, to cause the computer system to: detect, using a mobile device, a new Wi-Fi network connection is available for connection by the mobile device; determine that the new connection meets a first connection threshold based on first connection factors, one of the first connection factors includes determining a strength of the new network connection; analyze historical data regarding acceptance of Wi-Fi network connections for the device, the historical data including which connections were previously accepted by a user using the device to determine a pattern for accepting connections; determine, using the analysis of the historical data including the pattern for accepting a connection, when a second connection threshold is met based on the historical data; determine when to accept the new Wi-Fi network connection based on the new connection meeting the first connection threshold based on the first connection factors, and the second connection threshold based on the historical data; and initiate automatic acceptance of the new Wi-Fi connection, which includes automatic acceptance of a terms and conditions authorization received from the new network connection, in response to meeting the first connection threshold and the second connection threshold.

In another aspect according to the present invention, a computer program product for joining a Wi-Fi network with a mobile device based on historical device behavior is disclosed. The computer program product comprising a computer readable storage medium having program instructions embodied therewith, wherein the computer readable storage medium is not a transitory signal per se, the program instructions executable by a computer to cause the computer to perform a method, comprising: detecting, using a mobile device, a new Wi-Fi network connection is available for connection by the mobile device; determining that the new connection meets a first connection threshold based on first connection factors, one of the first connection factors includes determining a strength of the new network connection; analyzing historical data regarding acceptance of Wi-Fi network connections for the device, the historical data including which connections were previously accepted by a user using the device to determine a pattern for accepting connections; determining, using the analysis of the historical data including the pattern for accepting a connection, when a second connection threshold is met based on the historical data; determining when to accept the new Wi-Fi network connection based on the new connection meeting the first connection threshold based on the first connection factors, and the second connection threshold based on the historical data; and initiating automatic acceptance of the new Wi-Fi connection, which includes automatic acceptance of a terms and conditions authorization received from the new network connection, in response to meeting the first connection threshold and the second connection threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
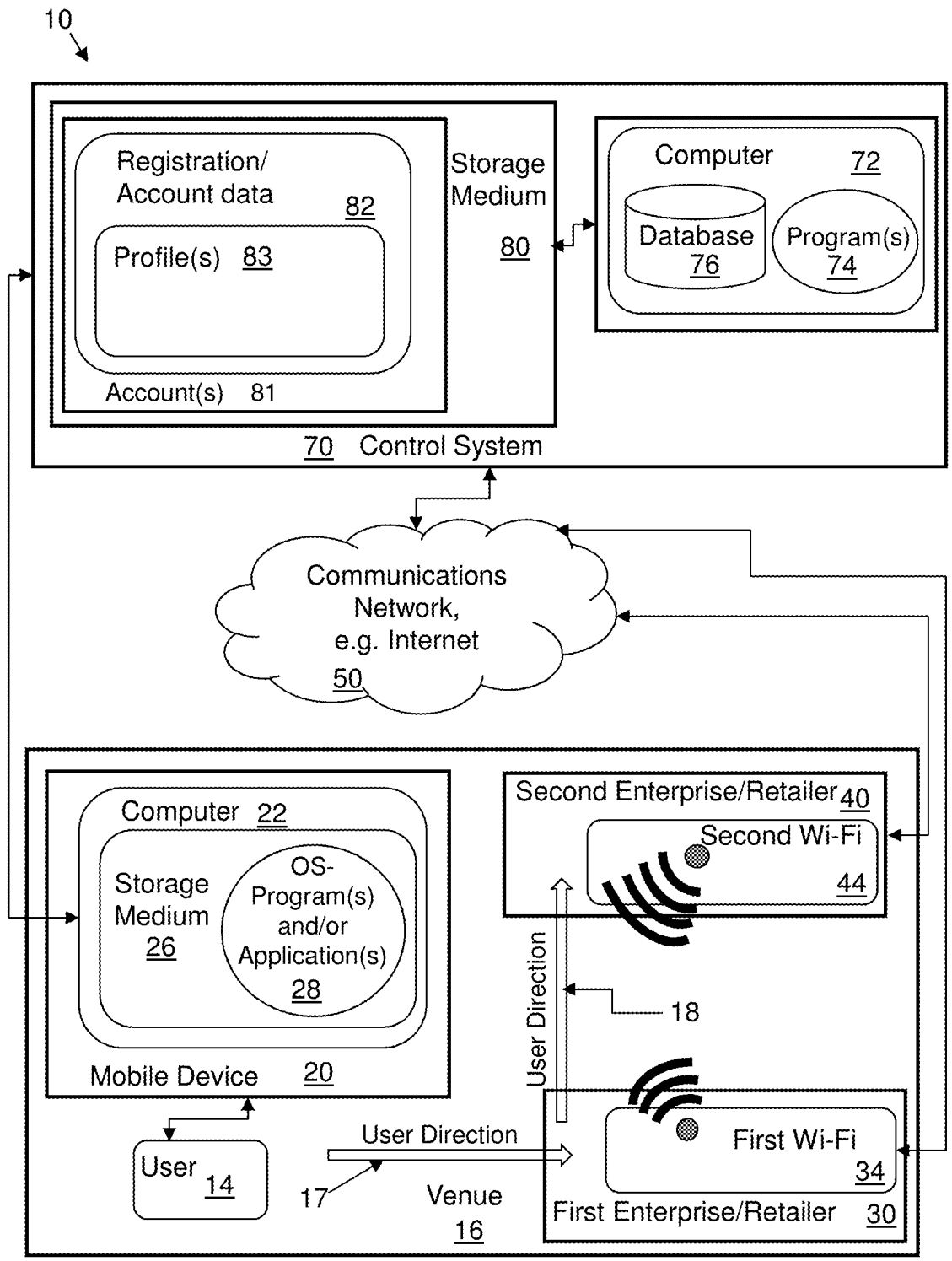
FIG. 1 is a schematic block diagram illustrating an overview of a system and methodology for joining a Wi-Fi network with a mobile device based on historical device behavior, according to an embodiment of the invention.
Figure 2:
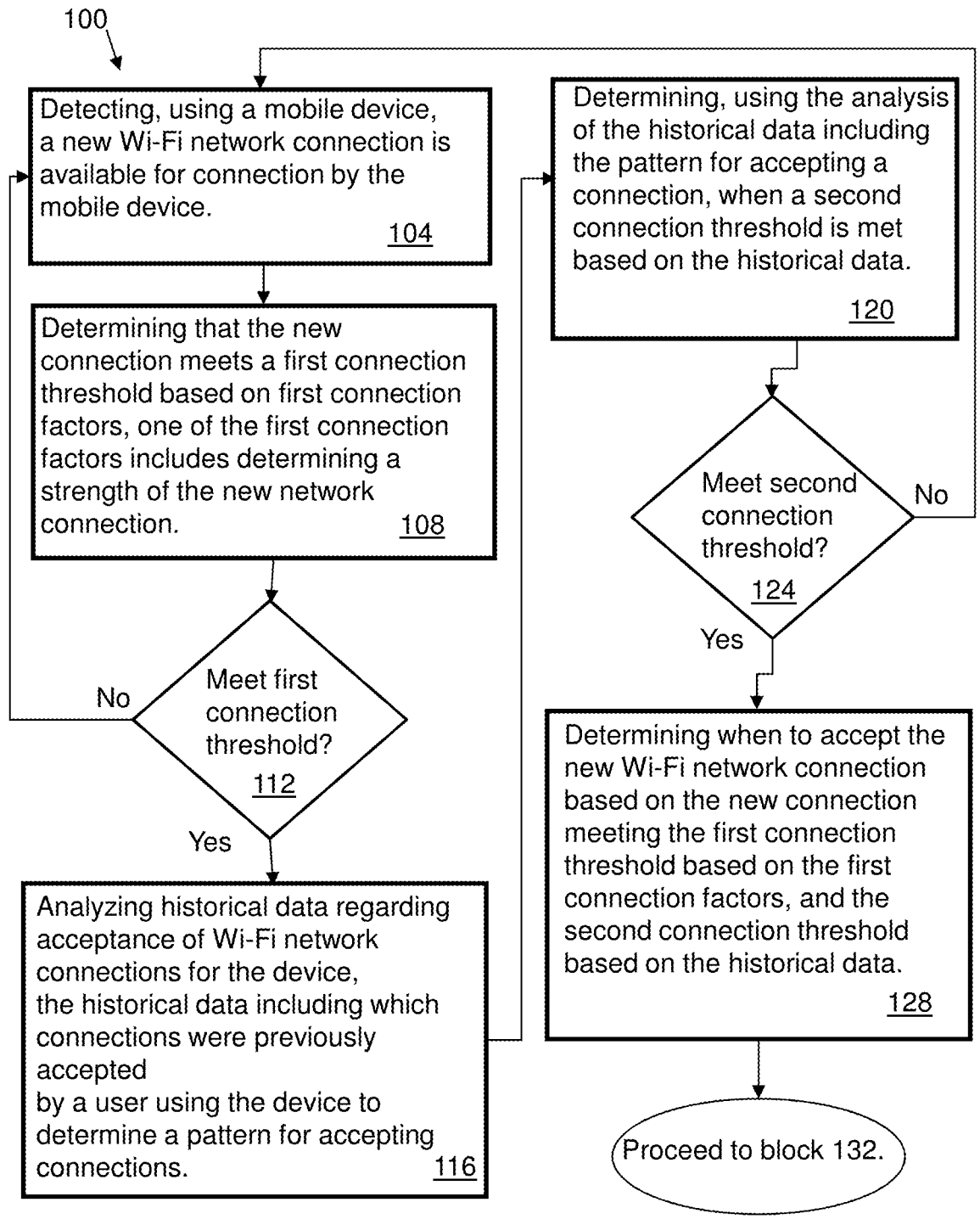
FIG. 2 is a flow chart illustrating a method, implemented using the system shown in FIG. 1, for joining a Wi-Fi network with a mobile device based on historical device behavior, according to an embodiment of the present invention.
Figure 3:
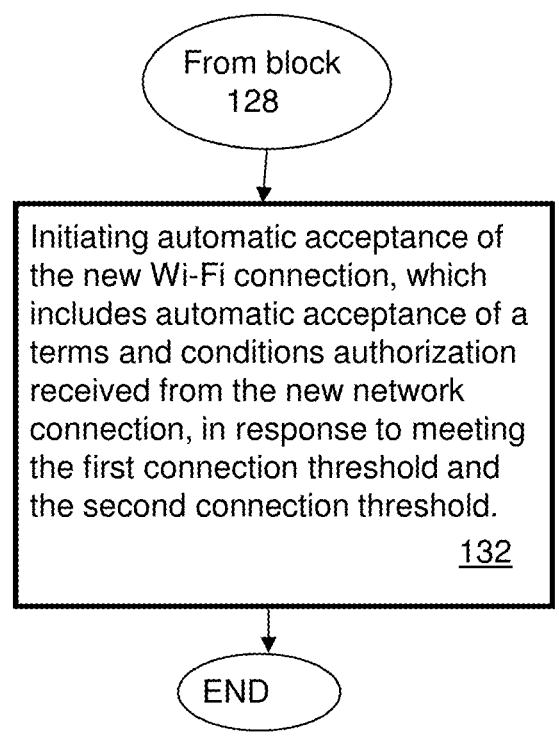
FIG. 3 is a flow chart continuing from the flow chart shown in FIG. 2.

Referring to FIGS. 1, 2 and 3, a method 100 (FIG. 2) with reference to a system 10 (FIG. 1) according to an embodiment of the present disclosure is provided for joining, or connecting to, a Wi-Fi network 306 (see FIG. 4) with a mobile device 20 based on historical device behavior. The mobile device is Wi-Fi capable and can detect a Wi-Fi network within a connection range of the device.

Figure 4:
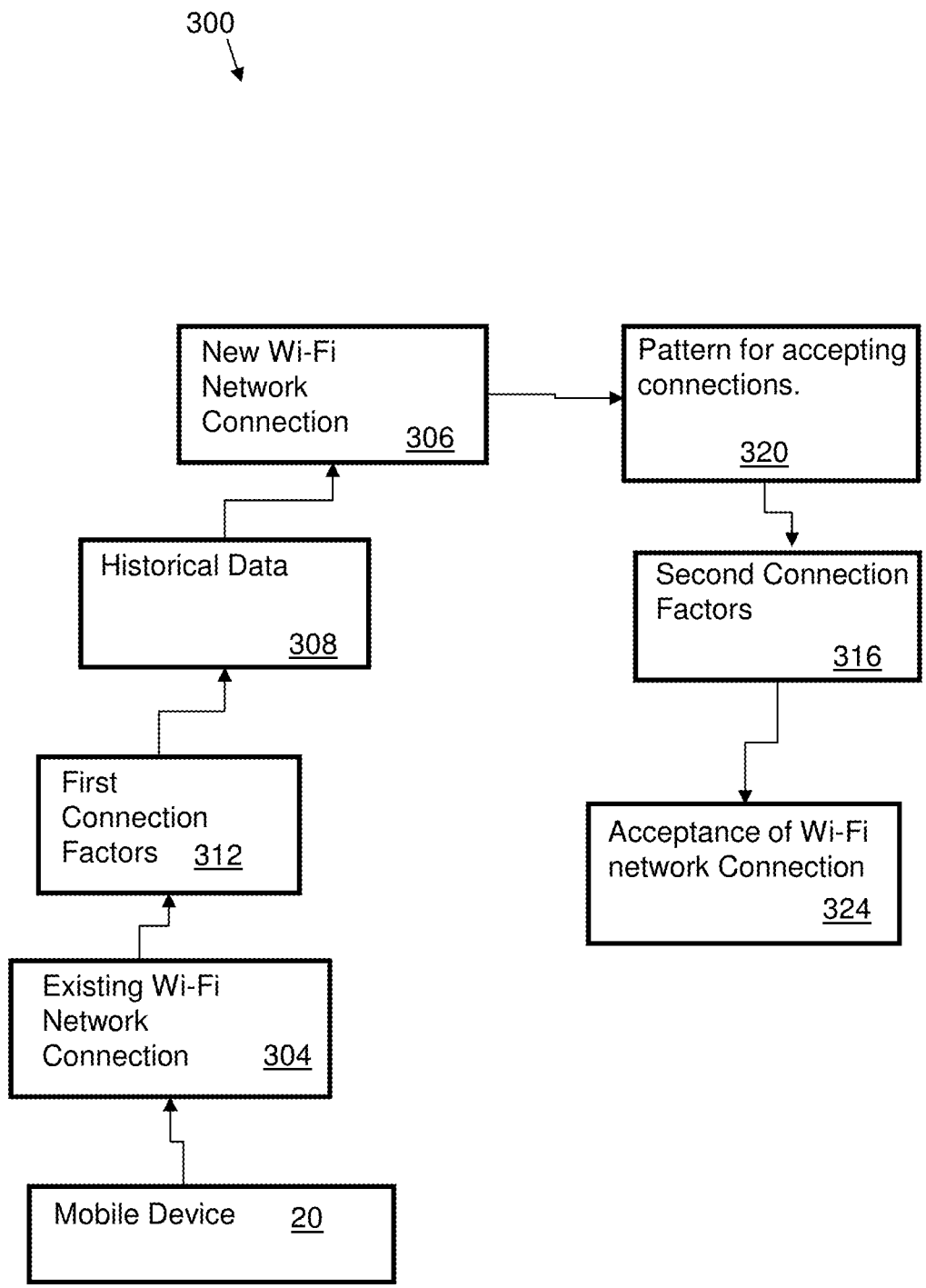
FIG. 4 is an instructional and functional schematic block diagram illustrating features of the present invention in association with the embodiments shown in FIGS. 1-3, 3A, 3B, for joining a Wi-Fi network with a mobile device based on historical device behavior, according to an embodiment of the present invention.

FIG. 4 is also referred to throughout the description in conjunction with the other FIGS. of the disclosure, as FIG. 4 refers to a system 300 having features, components, modules and functional elements according to the present disclosure.

It is envisioned that, in one embodiment, a control system 70 can communicate with a software application 28 on the mobile device 20, for implementing one or more embodiments of the present disclosure. In another example, the software application 28 can be part of an AI (Artificial Intelligence) system. The control system 70 can also represent a software application having a front-end user part, and a back-end part providing functionality. The control system can be part of an application's implementation and functionality, and/or can also, in one or more examples, interact with, encompass, or be part of larger systems, such as an AI system.

Referring to FIGS. 2 and 3, the method 100 includes detecting, using a mobile device, a new Wi-Fi network connection. The Wi-Fi network connection is available for connection by the mobile device for the purpose of joining, or connecting to, the new Wi-Fi network with the mobile device based on historical device behavior, as in block 104. Referring to FIG. 1, a user 14 can travel in a direction as indicated by arrows 17 and 18 in venue 16. In one example, the user 14 can travel to the vicinity or go within a first enterprise or retailer 30 having a first Wi-Fi connection 34, and then travel to within a vicinity, or go within, a second enterprise or retailer 40 having a second Wi-Fi 44 connection. The first and second Wi-Fi connections having a range and connection terms and conditions, respectively, for connecting to each of the respective Wi-Fi connections.

The method includes determining that the new connection meets a first connection threshold based on first connection factors, as in block 108, and one of the first connection factors includes determining a strength of the new network connection. Other factors can include determining when the device has an existing Wi-Fi connection; and when the device does not have or lacks a Wi-Fi connection. Additionally, other factors can include determining when an existing connection is stronger or weaker than another available connection. In one example, the connection strength can be compared between an existing connection and a new connection which is available.

Such information or data about the strength or weakness of an existing connection and/or another available connection can be received, at the control system 70.

The method determines when the first connection threshold is met at block 112. When the first connection threshold is not met, the method returns to block 104 to detect a new Wi-Fi network connection. When the first connection threshold is met (at block 108), the method continues from block 112 to block 116.

The method includes analyzing historical data regarding acceptance of Wi-Fi network connections for the device, at block 116. The historical data including which connections were previously accepted by a user 14 using the mobile device 20 (or for example, a laptop, smart phone, or other Wi-Fi connected device) is used to determine a pattern for accepting connections by the user using the device. Also, in one example, historical data can be retrieved from a different mobile device which is not in use but is also related to a user. For example, a different mobile device can include a previous smartphone, or tablet.

The method includes determining, using the analysis of the historical data including the pattern for accepting a connection, when a second connection threshold is met based on the historical data, as in block 120.

The method determines when the second connection threshold is met at block 124. When the second connection threshold is not met, the method returns to block 104 to detect another new Wi-Fi network connection. The method can include logging networks that were not accepted as included in the historical data, thereby the historical data can include when a network was accepted as well as when a network was declined as not meeting a second connection threshold. When the first connection threshold is met, the method continues to block 128.

The method includes determining when to accept the new Wi-Fi network connection based on the new connection meeting the first connection threshold based on the first connection factors, and the second connection threshold based on the historical data, as in block 128.

The method includes initiating automatic acceptance of the new Wi-Fi connection, which includes automatic acceptance of a terms and conditions authorization received from the new network connection, in response to meeting the first connection threshold and the second connection threshold, as in block 132.

Figures 3A, 3B:
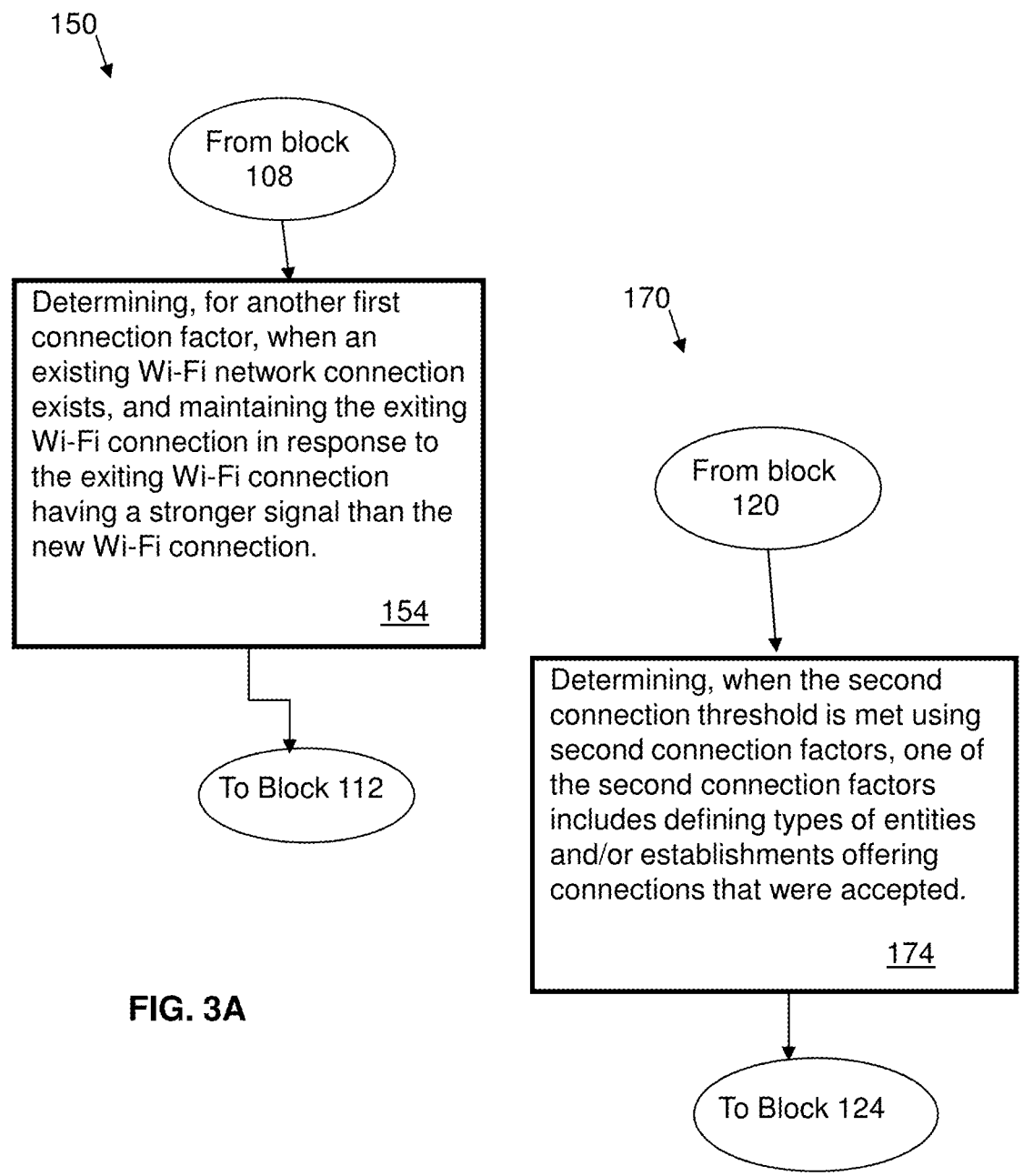
FIG. 3A is an alternative embodiment according to the present invention adding to the method shown in FIG. 2.
FIG. 3B is an alternative embodiment according to the present invention adding to the method shown in FIG. 2.

Referring to FIG. 3A, in one embodiment according to the present disclosure, a method 150 continues from block 108 of FIG. 2, and includes determining, for another first connection factor, when an existing Wi-Fi network connection exists, as in block 154. The method maintains the Wi-Fi connection in response to the existing Wi-Fi connection having a stronger signal than the new Wi-Fi connection.

In another example, the method 100 includes determining, for another first connection factor, when an existing Wi-Fi network connection exists. The method accepts the new Wi-Fi connection in response to the existing Wi-Fi connection having a weaker signal than the new Wi-Fi connection.

In another example, the method 100 includes determining, for another first connection factor, when an existing Wi-Fi network connection is lacking. The method accepts the new Wi-Fi connection in response to the lack of the existing Wi-Fi connection, regardless of the new Wi-Fi connection strength.

Referring to FIG. 3B, in one embodiment according to the present disclosure, a method 170 continues from block 120 of FIG. 2 and the method 170 includes determining, when the second connection threshold is met using second connection factors, as in block 174. One of the second connection factors includes defining types of connections which were previous accepted, and using previous types of connections accepted as a criteria for accepting new connections. In one example, when a previous type of connection is accepted, the method can automatically accept a new Wi-Fi connection of the same type.

In another example, one of the second connection factors includes defining types of entities and/or establishments offering connections that were accepted. In one example, when a user always accepts a network connection from a type of establishment, the method can meet the second connection threshold when a similar type of establishment Wi-Fi is detected for connection. In one example, a user may always accept connections from retail establishments. Thus, in one example the method can meet the second connection threshold when a retail establishment Wi-Fi establishment is available. In another example, a type supply the security issues that would qualify for this (not the establishment type).

In one example, the historical data can include a type of connection which is consistently accepted or accepted with a frequency to meet a specified threshold, and vice versa, as applied to declining a network connection. Such a type of connection may refer to data speed of the connection, such as high speed data transfer, or reduced data transfer speeds. In another example, a type of connection can include network connections which require data transfer permission.

In another example, regarding when the second connection threshold is met using second connection factors, one of the second connection factors includes received user data on types of network for acceptance, including security of a network.

In another example, one of the second connection factors includes historical data regarding Wi-Fi parameters. Such parameters can include security issues, for example, if a Wi-Fi network connection has a security policy that meets a standard set by a user. In another example, a user may consistently accept a Wi-Fi connection terms and conditions policy from large retail stores. Such history can be used to meet the second threshold and accept the Wi-Fi connection automatically.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile 83 and/or profile data), un-registering, and/or opt-out of any registration. It is understood that such opting-out includes disposal of all data in a secure manner.

Also, referring to FIG. 1, the user device(s) such as the mobile device 20 can include a computer 22, storage medium 26, and operating systems and programs or an application 28 stored on the storage medium 26. These features are generically shown in the Figures.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system, such as the control system 70 via a communications network 50, e.g., the Internet, and access data, and cooperate with program(s) stored on the control system. In the embodiment of the disclosure shown in FIGS. 1 and 2, the method 100 is incorporated in a program or application 66, which can also be referred to as a software application 66 and stored on the first devices 24. The application can communicate with a control system 70 via a communications network 50. The control system 70 includes a computer 72 having a database 76 and one or more programs 74. In the embodiment of the disclosure shown in FIG. 1, the application 66 communicates with the control system 70 and the one or more programs 74. The control system includes the computer 72 which also has access to the database 76. The control system 70 includes a storage medium 80 for maintaining a registration and account data 82. Such account data can include one or more profiles 83. In an embodiment, the method and system which incorporates the present disclosure includes the control system (generally referred to as the back-end) in combination and cooperation with a front end of the method and system, which is the application. The application is stored on a device and can access data and additional programs at a back end of the application.

It is also understood that the method 100 according to an embodiment of the present disclosure, can be incorporated in (Artificial Intelligence) AI devices, which can communicate with respective AI systems, and respectively AI system platforms. The platforms can be enabling for the AI systems and the devices that employ them. Thereby, such programs or an application incorporating the method of the present disclosure, as discussed above, can be part of an AI system.

Figure 5:
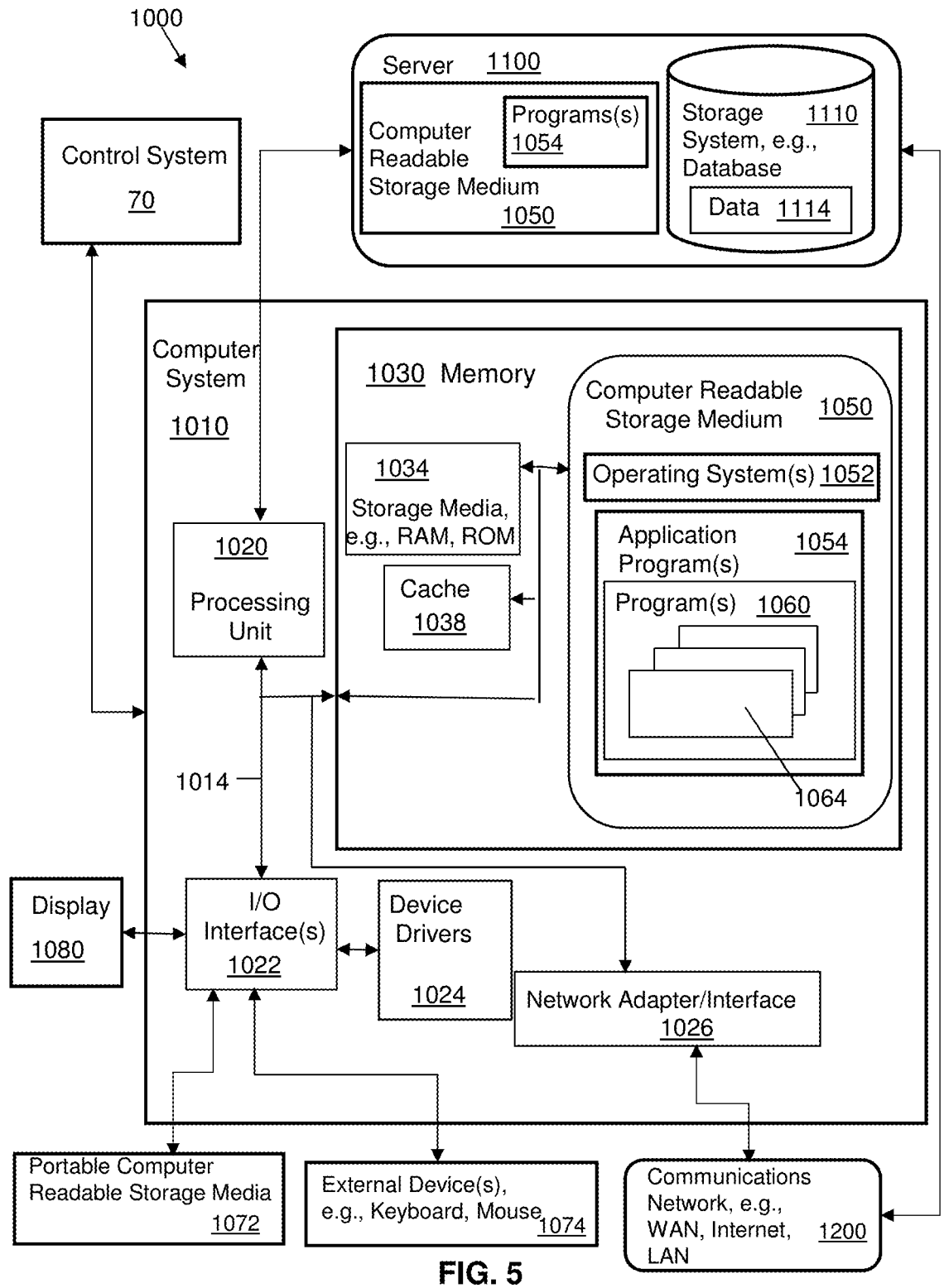
FIG. 5 is a schematic block diagram depicting a computer system according to an embodiment of the disclosure which may be incorporated, all or in part, in one or more computers or devices shown in FIG. 1, and cooperates with the system and methods shown in FIGS. 1-4.

Referring to FIG. 5, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components, to achieve the control system functions described the present disclosure.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
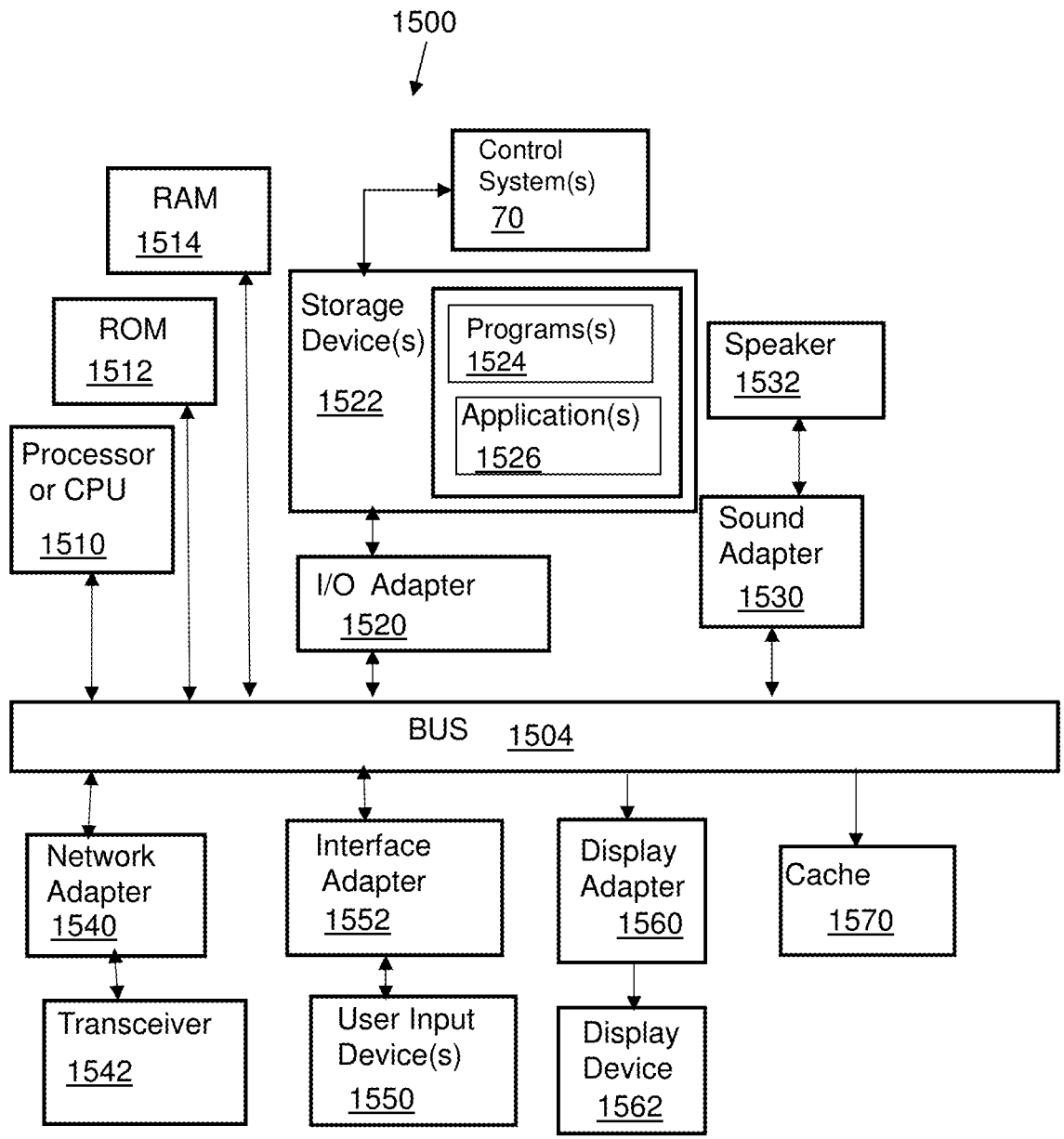
FIG. 6 is a schematic block diagram of a system depicting system components interconnected using a bus. The components for use, in all or in part, with the embodiments of the present disclosure, in accordance with one embodiment of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
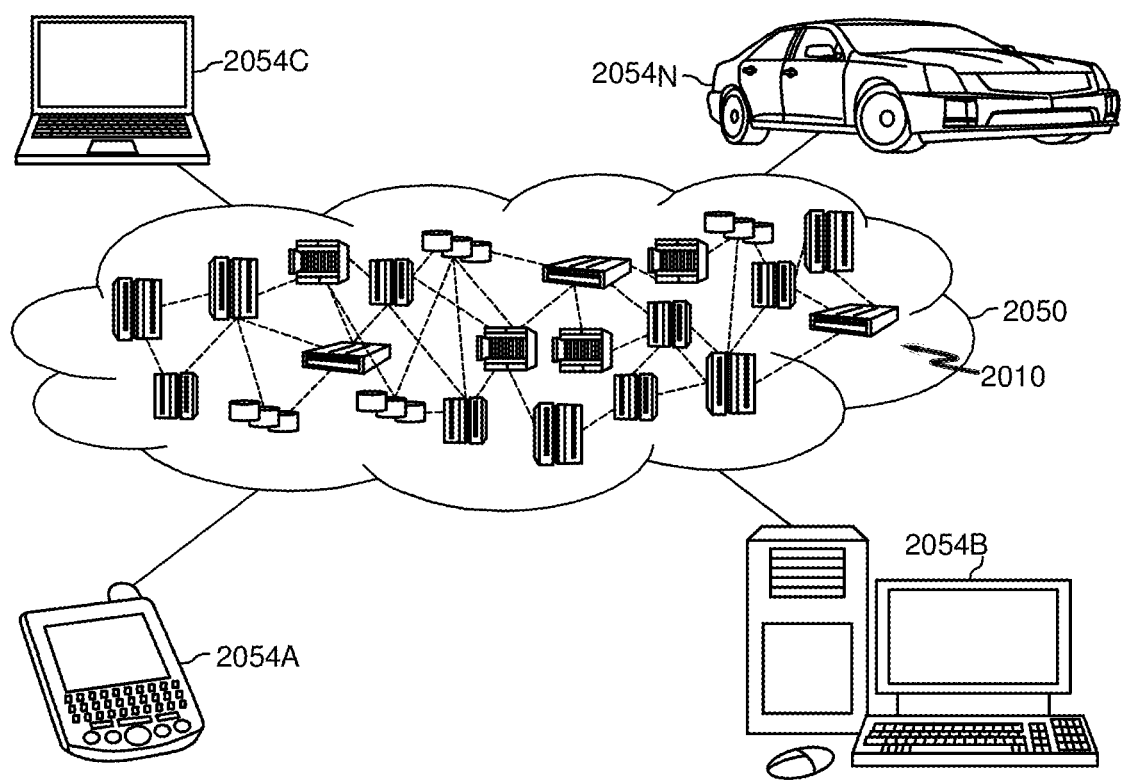
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
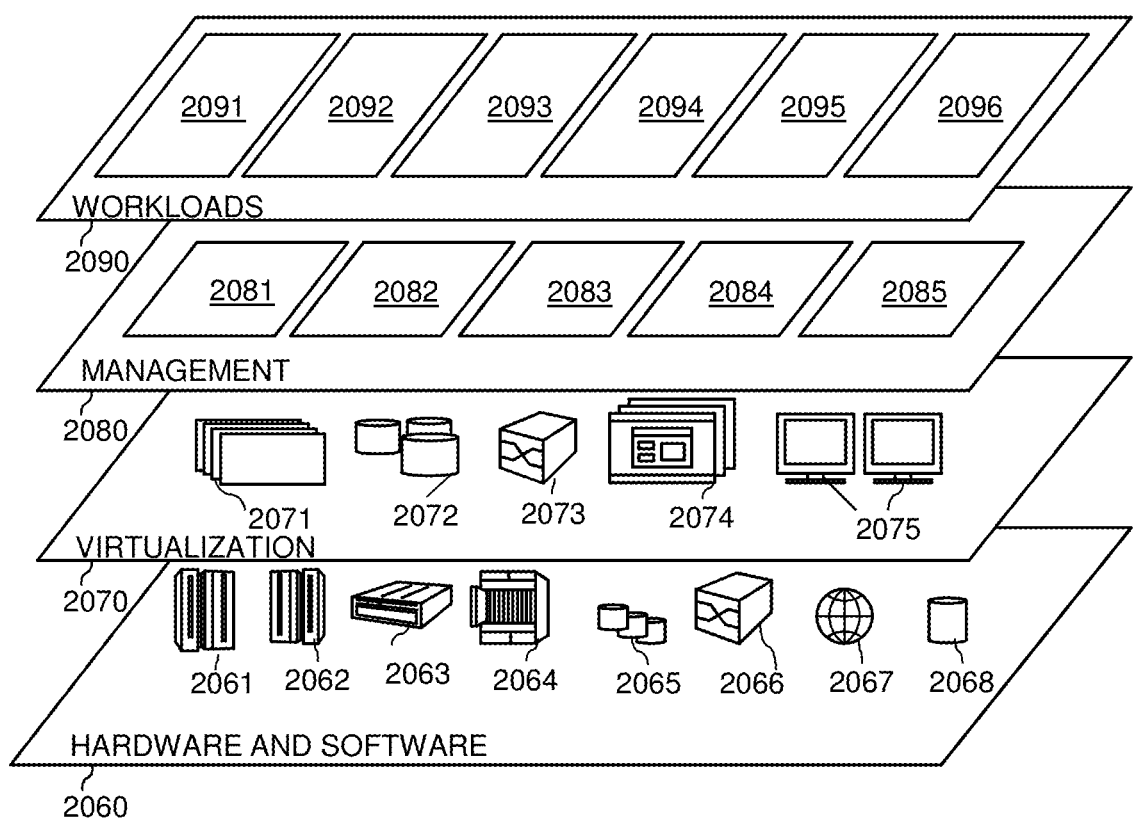
FIG. 8 is a block diagram depicting abstraction model layers according to an embodiment of the present invention.

Referring now to FIG. 8, a set of functional abstraction layers provided by cloud computing environment 2050 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and a technique for joining a Wi-Fi network with a mobile device based on historical device behavior 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for joining a Wi-Fi network with a mobile device based on historical device behavior, comprising:
   detecting, using a mobile device, a new Wi-Fi network connection is available for connection by the mobile device;
   determining that the new connection meets a first connection threshold based on first connection factors, one of the first connection factors includes determining a strength of the new network connection;
   analyzing historical data regarding acceptance of Wi-Fi network connections for the device, the historical data including which connections were previously accepted by a user using the device to determine a pattern for accepting connections;
   the historical data including when a network was accepted as meeting the second connection threshold, and when a network was declined as not meeting the second connection threshold;
   the analysis of the historical data including determining the pattern for accepting connections by the user using the device based on the historical data for accepting a connection;
   determining, using the analysis of the historical data including the pattern for accepting a connection, when a second connection threshold is met based on the historical data;
   determining when to accept the new Wi-Fi network connection based on the new connection meeting the first connection threshold based on the first connection factors, and the second connection threshold based on the historical data including the pattern; and
   initiating automatic acceptance of the new Wi-Fi connection, which includes automatic acceptance of a terms and conditions authorization received from the new network connection, in response to meeting the first connection threshold and the second connection threshold.

2. The method of claim 1, further comprising:
   determining, for another first connection factor, when an existing Wi-Fi network connection exists, and
   maintaining the existing Wi-Fi connection in response to the existing Wi-Fi connection having a stronger signal than the new Wi-Fi connection.

3. The method of claim 1, comprising:
   determining, for another first connection factor, when an existing Wi-Fi network connection exists; and
   accepting the new Wi-Fi connection in response to the existing Wi-Fi connection having a weaker signal than the new Wi-Fi connection.

4. The method of claim 1, further comprising:
   determining, for another first connection factor, when an existing Wi-Fi network connection is lacking; and
   accepting the new Wi-Fi connection in response to the lack of the existing Wi-Fi connection, regardless of the new Wi-Fi connection strength.

5. The method of claim 1, comprising:
   determining, when the second connection threshold is met using second connection factors, one of the second connection factors includes defining types of connections which were previous accepted.

6. The method of claim 1, comprising:
   determining, when the second connection threshold is met using second connection factors, one of the second connection factors includes defining types of entities and/or establishments offering connections that were accepted.

7. The method of claim 1, comprising:
   determining, when the second connection threshold is met using second connection factors, one of the second connection factors includes received user data on types of network for acceptance, including security of a network.

8. The method of claim 1, comprising:
   determining, when the second connection threshold is met, using second connection factors, one of the second connection factors includes historical data regarding Wi-Fi parameters.

9. A system for joining a Wi-Fi network with a mobile device based on historical device behavior, which comprises:
   a computer system comprising: a computer processor, a computer-readable storage medium, and program instructions stored on the computer-readable storage medium being executable by the processor, to cause the computer system to:
   detect, using a mobile device, a new Wi-Fi network connection is available for connection by the mobile device;

determine that the new connection meets a first connection threshold based on first connection factors, one of the first connection factors includes determining a strength of the new network connection;
analyze historical data regarding acceptance of Wi-Fi network connections for the device, the historical data including which connections were previously accepted by a user using the device to determine a pattern for accepting connections;
the historical data including when a network was accepted as meeting the second connection threshold, and when a network was declined as not meeting the second connection threshold;
the analysis of the historical data includes determining the pattern for accepting connections by the user using the device based on the historical data for accepting a connection;
determine, using the analysis of the historical data including the pattern for accepting a connection, when a second connection threshold is met based on the historical data;
determine when to accept the new Wi-Fi network connection based on the new connection meeting the first connection threshold based on the first connection factors, and the second connection threshold based on the historical data including the pattern; and
initiate automatic acceptance of the new Wi-Fi connection, which includes automatic acceptance of a terms and conditions authorization received from the new network connection, in response to meeting the first connection threshold and the second connection threshold.

10. The system of claim 9, further comprising:
determining, for another first connection factor, when an existing Wi-Fi network connection exists, and
maintaining the existing Wi-Fi connection in response to the existing Wi-Fi connection having a stronger signal than the new Wi-Fi connection.

11. The system of claim 9, comprising:
determining, for another first connection factor, when an existing Wi-Fi network connection exits; and
accepting the new Wi-Fi connection in response to the existing Wi-Fi connection having a weaker signal than the new Wi-Fi connection.

12. The system of claim 9, further comprising:
determining, for another first connection factor, when an existing Wi-Fi network connection is lacking; and
accepting the new Wi-Fi connection in response to the lack of the existing Wi-Fi connection, regardless of the new Wi-Fi connection strength.

13. The system of claim 9, comprising:
determining, when the second connection threshold is met using second connection factors, one of the second connection factors includes defining types of connections which were previous accepted.

14. The system of claim 9, comprising:
determining, when the second connection threshold is met using second connection factors, one of the second connection factors includes defining types of entities and/or establishments offering connections that were accepted.

15. The system of claim 9, comprising:
determining, when the second connection threshold is met using second connection factors, one of the second connection factors includes received user data on types of network for acceptance, including security of a network.

16. The system of claim 9, comprising:
determining, when the second connection threshold is met, using second connection factors, one of the second connection factors includes historical data regarding Wi-Fi parameters.

17. A computer program product for joining a Wi-Fi network with a mobile device based on historical device behavior, the computer program product comprising a computer readable storage medium having program instructions embodied therewith, wherein the computer readable storage medium is not a transitory signal per se, the program instructions executable by a computer to cause the computer to perform a method, comprising:
detecting, using a mobile device, a new Wi-Fi network connection is available for connection by the mobile device;
determining that the new connection meets a first connection threshold based on first connection factors, one of the first connection factors includes determining a strength of the new network connection;
analyzing historical data regarding acceptance of Wi-Fi network connections for the device, the historical data including which connections were previously accepted by a user using the device to determine a pattern for accepting connections;
the historical data including when a network was accepted as meeting the second connection threshold, and when a network was declined as not meeting the second connection threshold;
the analysis of the historical data including determining the pattern for accepting connections by the user using the device based on the historical data for accepting a connection;
determining, using the analysis of the historical data including the pattern for accepting a connection, when a second connection threshold is met based on the historical data;
determining when to accept the new Wi-Fi network connection based on the new connection meeting the first connection threshold based on the first connection factors, and the second connection threshold based on the historical data including the pattern; and
initiating automatic acceptance of the new Wi-Fi connection, which includes automatic acceptance of a terms and conditions authorization received from the new network connection, in response to meeting the first connection threshold and the second connection threshold.

18. The computer program product of claim 17, further comprising:
determining, for another first connection factor, when an existing Wi-Fi network connection exists, and maintaining the existing Wi-Fi connection in response to the existing Wi-Fi connection having a stronger signal than the new Wi-Fi connection.

19. The computer program product of claim 17, further comprising:
determining, for another first connection factor, when an existing Wi-Fi network connection exits; and
accepting the new Wi-Fi connection in response to the existing Wi-Fi connection having a weaker signal than the new Wi-Fi connection.

20. The computer program product of claim 17, further comprising:
determining, for another first connection factor, when an existing Wi-Fi network connection is lacking; and accepting the new Wi-Fi connection in response to the lack of the existing Wi-Fi connection, regardless of the new Wi-Fi connection strength.

* * * * *